(12) United States Patent
Ryan et al.

(10) Patent No.: US 8,717,696 B1
(45) Date of Patent: May 6, 2014

(54) DISK DRIVE ADJUSTING NOISE SPECTRUM TO REDUCE RESONANCE EXCITATION OF SHOCK DETECTOR

(71) Applicant: Western Digital Technologies, Inc., Irvine, CA (US)

(72) Inventors: Robert P. Ryan, Mission Viejo, CA (US); Erik J. Eklund, Costa Mesa, CA (US); Hien T. Chu, Fountain Valley, CA (US); Alain Chahwan, Irvine, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/693,318

(22) Filed: Dec. 4, 2012

(51) Int. Cl.
*G11B 27/36* (2006.01)

(52) U.S. Cl.
USPC .......................................................... 360/31

(58) Field of Classification Search
None
See application file for complete search history.

(56) References Cited

U.S. PATENT DOCUMENTS 7,852,588 B1   12/2010  Ferris et al.
8,179,626 B1   5/2012   Ryan et al.

*Primary Examiner* — Paul Huber

(57) ABSTRACT

A disk drive is disclosed comprising a head actuated over a disk, and control circuitry including a shock detector. A shock threshold of the shock detector is initialized, and a first number of shock events is detected in response to the shock detector operating at the initial shock threshold. When the first number of shock events exceeds an upper event threshold, a control signal is adjusted in order to adjust a frequency spectrum of noise affecting the shock detector. After adjusting the control signal, a second number of shock events is detected in response to the shock detector operating at the initial shock threshold. When the second number of shock events exceeds the upper event threshold, the shock threshold is increased.

22 Claims, 5 Drawing Sheets

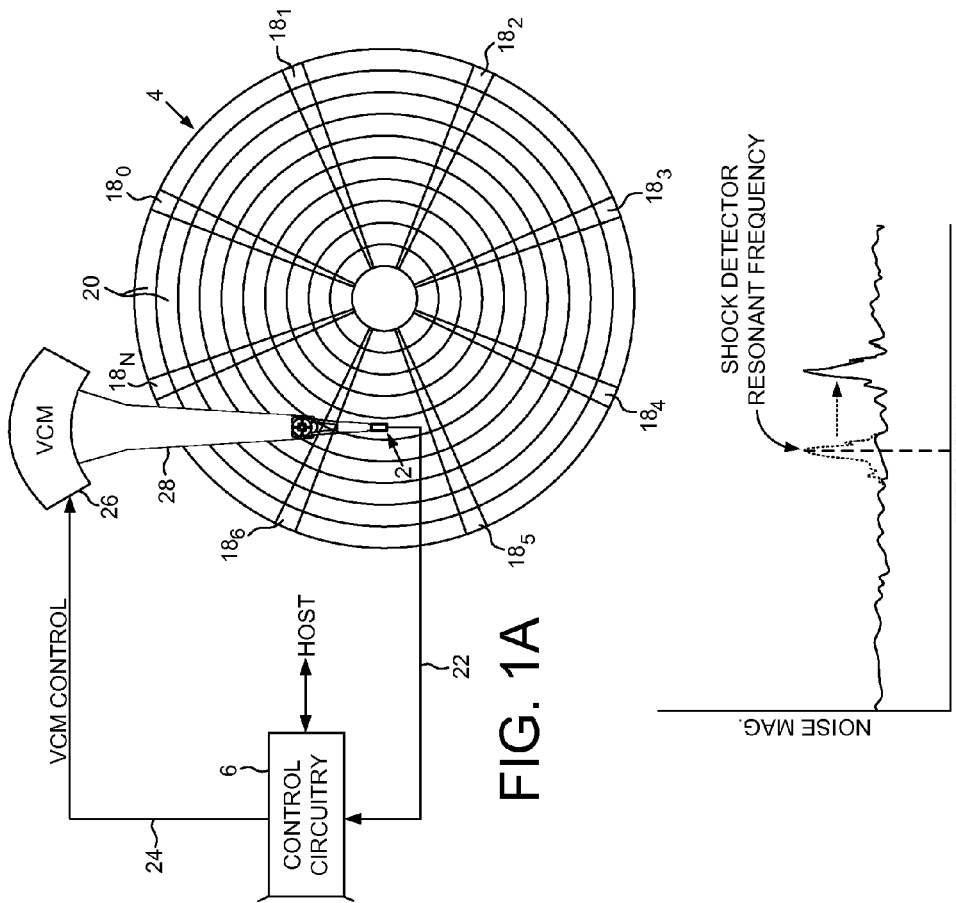
FIG. 1A
FIG. 1B
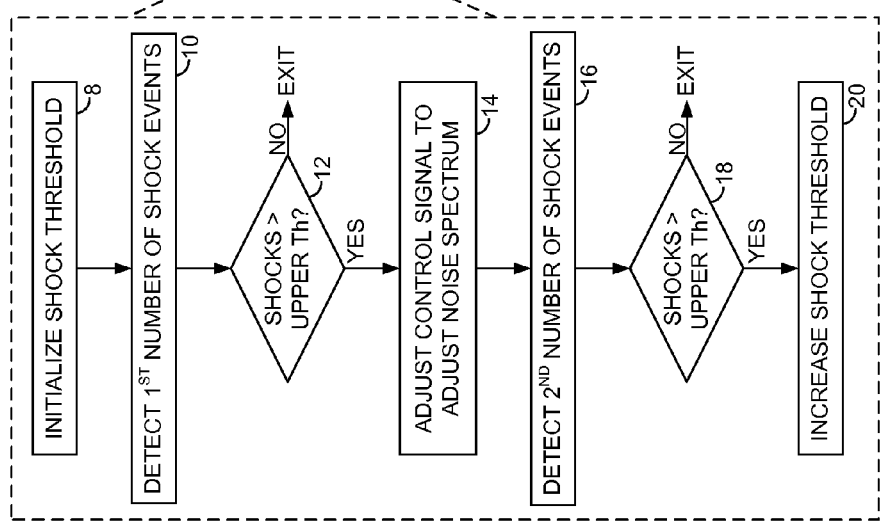
FIG. 1C

DISK DRIVE ADJUSTING NOISE SPECTRUM TO REDUCE RESONANCE EXCITATION OF SHOCK DETECTOR

BACKGROUND

A disk drive comprises a disk rotated by a spindle motor, and a head connected to a distal end of an actuator arm which is rotated about a pivot by a voice coil motor (VCM) to position the head radially over the disk. The disk comprises a number of concentric data tracks each partitioned into a number of data sectors. Access operations are performed by seeking the head to a target data track, and performing a write/read operation on the data sectors within the data track. The disk comprises embedded servo sectors having position information recorded therein, such as coarse position information (e.g., a track address) and fine position information (e.g., servo bursts). Control circuitry processes the read signal emanating from the head in order to demodulate the servo sectors into a control signal applied to the VCM in order to position the head over the target data track.

Physical shocks to the disk drive may cause the head to deviate from the target track and corrupt data recorded in an adjacent track during a write operation. Therefore, if a physical shock is detected using a suitable sensor (e.g., an accelerometer), the write operation is typically aborted and then retried. However, the system noise (electrical and/or mechanical) may excite a resonant frequency of the shock sensor which can trigger a false shock detection, thereby degrading the performance of the disk drive due to the unnecessary slipped disk revolutions.

BRIEF DESCRIPTION OF THE DRAWINGS

FIG. 1A shows a disk drive according to an embodiment of the present invention comprising a head actuated over a disk, and control circuitry including a shock detector.

FIG. 1B shows an embodiment of the present invention wherein a control signal is adjusted in order to adjust a frequency spectrum of noise affecting the shock detector.

FIG. 1C is a flow diagram according to an embodiment of the present invention wherein a shock threshold is increased if adjusting the control signal is not sufficient.

DETAILED DESCRIPTION

Figure 2:
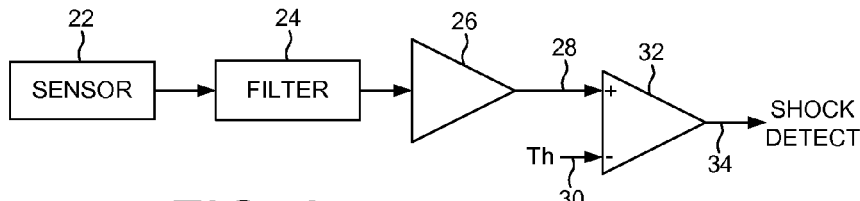
FIG. 2 shows a shock detector according to an embodiment of the present invention comprising a shock sensor for generating a shock signal that is compared to the shock threshold.

FIG. 1A shows a disk drive according to an embodiment of the present invention comprising a head 2 actuated over a disk 4, and control circuitry 6 including a shock detector. The control circuitry 6 executes the flow diagram of FIG. 1C, wherein a shock threshold of the shock detector is initialized (block 8), and a first number of shock events is detected in response to the shock detector operating at the initial shock threshold (block 10). When the first number of shock events exceeds an upper event threshold (block 12), a control signal is adjusted in order to adjust a frequency spectrum of noise affecting the shock detector (block 14). After adjusting the control signal, a second number of shock events is detected in response to the shock detector operating at the initial shock threshold (block 16). When the second number of shock events exceeds the upper event threshold (block 18), the shock threshold is increased (block 20).

FIG. 1B shows a frequency spectrum of noise (electrical and/or mechanical) that may excite a resonant frequency of the shock detector which can trigger a false shock detection, thereby degrading the performance of the disk drive due to the unnecessary slipped disk revolutions. In the embodiments of the present invention, one or more electrical and/or mechanical components of the disk drive may contribute to the noise affecting the shock detector, such as noise generated by a voltage regulator, or noise generated by a pulse width modulated (PWM) control system, or noise generated by a supply voltage received from a host. As shown in the example of FIG. 1B, a peak in the noise spectrum caused by an electrical and/or mechanical component may align with the resonant frequency of the shock detector, thereby triggering false shock detections. Accordingly in the embodiments of the present invention a control signal that controls one or more electrical and/or mechanical components is adjusted in order to adjust the frequency spectrum of the noise affecting the shock detector as illustrated in FIG. 1B (where the dotted line peak in the noise spectrum is shifted to a higher frequency away from the resonant frequency of the shock detector).

Any suitable shock detector may be employed in the embodiments of the present invention. FIG. 2 shows an embodiment of a shock detector comprising a suitable sensor 22 (such as any suitable accelerometer) for detecting a physical shock to the disk drive. The output of the sensor 22 is filtered 24 and amplified 26, and the amplified sensor signal 28 is compared to a shock threshold 30 at comparator 32. A shock event 34 is detected when the amplified sensor signal 28 exceeds the shock threshold 30. If a peak in the system noise aligns with a resonant frequency of the shock detector, the comparator 32 will detect an excessive amount of false shock events 34.

Figure 3:
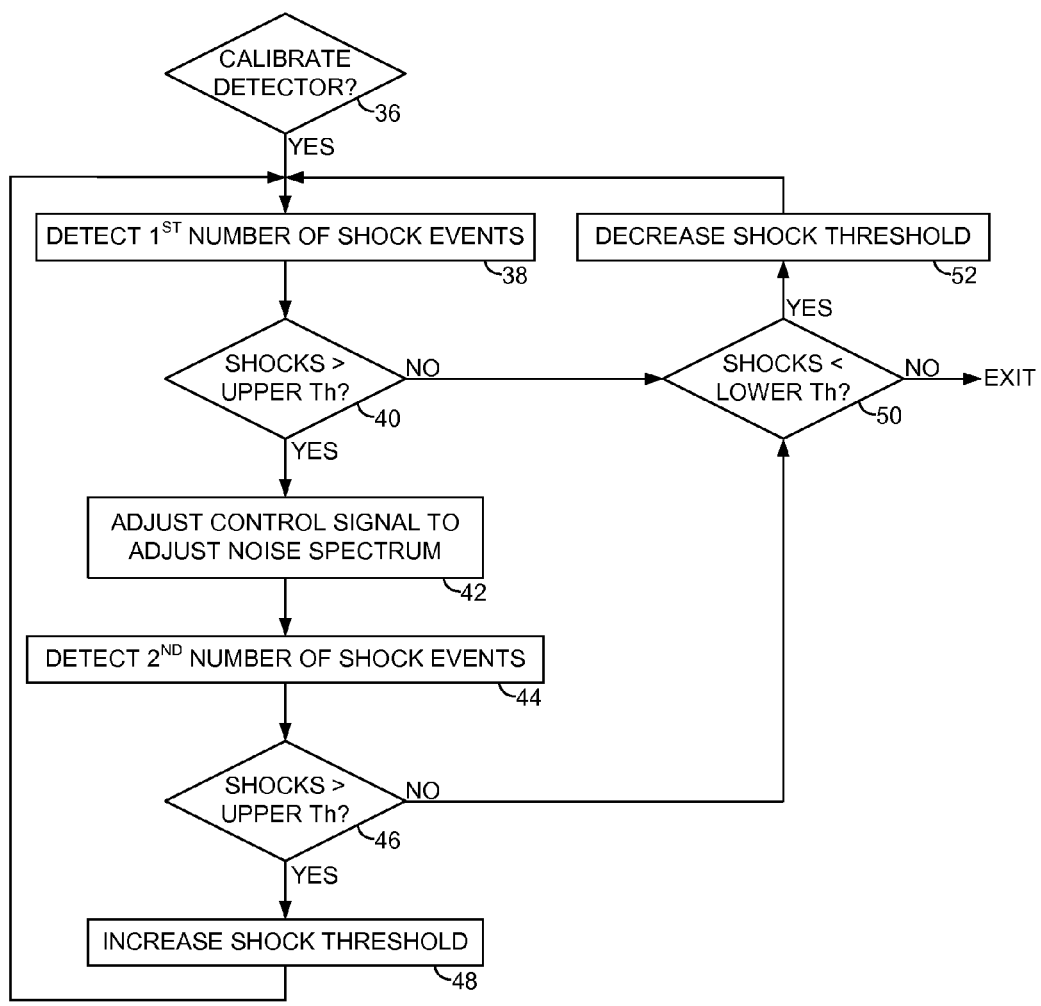
FIG. 3 is a flow diagram according to an embodiment of the present invention wherein the threshold of the shock detector is adjusted if a number of detected shock events is greater than an upper event threshold or less than a lower event threshold.

FIG. 3 is a flow diagram according to an embodiment wherein the control circuitry 6 determines a need to calibrate the shock detector (block 36), for example while the disk drive is servicing access commands. A first number of shock events is detected over a predetermined interval (block 38), and if the first number of shock events exceeds an upper event threshold (block 40), it is an indication that too many false shock events are being detected. Therefore the control circuitry 6 adjusts the control signal in order to adjust a frequency spectrum of noise affecting the shock detector (block 42). After adjusting the control signal, a second number of shock events is detected over a predetermined interval (block 44), and if the second number of shock events does not exceed the upper event threshold (block 46), it means the frequency spectrum of the noise affecting the shock detector has changed sufficiently so that the false shock events are no longer being detected. If the second number of shock events exceeds the upper event threshold (block 46), it means the frequency spectrum of the noise affecting the shock detector has not changed sufficiently. Therefore the shock threshold for the shock detector (e.g., threshold 30 in FIG. 2) is increased (block 48) in order to reduce the sensitivity of the shock detector. The flow diagram is then repeated starting from block 38.

In the embodiment of FIG. 3, if the first number of shock events detected at block 40 does not exceed the upper event threshold (block 40), or if the second number of shock events does not exceed the upper event threshold (block 46), then the detected number of shock events is compared to a lower event threshold (block 50). If the detected number shock events falls below the lower event threshold (block 50), then the shock threshold for the shock detector is decreased (block 52) in order to increase the sensitivity of the shock detector. In other words, the flow diagram of FIG. 3 adjusts the control signal and/or the shock threshold of the shock detector until the number of detected shock events falls within an acceptable range.

Figure 4:
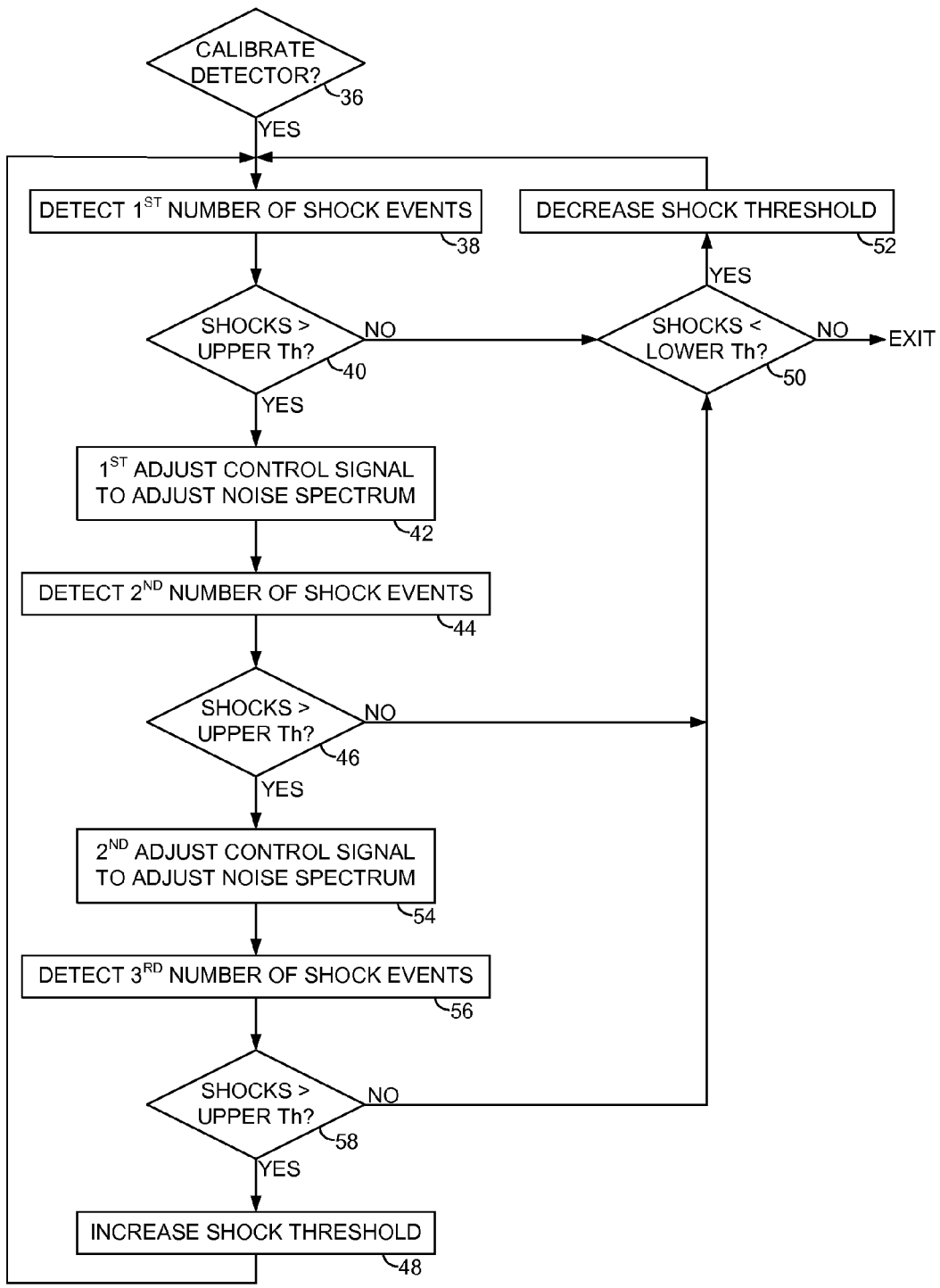
FIG. 4 is a flow diagram according to an embodiment of the present invention wherein the control signal is adjusted at least twice prior to increasing the shock threshold of the shock detector.

FIG. 4 is a flow diagram according to an embodiment which expands on the flow diagram of FIG. 3. If after first adjusting the control signal (block 42) the second number of detected shock events exceeds the upper event threshold (block 46), then the control circuitry 6 second adjusts the control signal (block 54). For example, the control circuitry 6 may configure the control signal with a first setting, and if the first setting does not adequately adjust the frequency spectrum of the noise, the control circuitry 6 may configure the control signal with a second setting. The control circuitry 6 then detects a third number of shock events over a predetermined interval (block 56), and if the third number of shock events does not exceed the upper event threshold (block 58), it means the frequency spectrum of the noise affecting the shock detector has changed sufficiently so that the false shock events are no longer being detected. Otherwise, the shock threshold of the shock detector is increased (block 48) in order to reduce the sensitivity of the shock detector. Although in the embodiment of FIG. 4 only two adjustments to the control signal are shown, in other embodiments the control signal may be adjusted any suitable number of times before increasing the shock threshold of the shock detector. In addition, while the embodiment of FIG. 4 illustrates adjustments to a single control signal, in other embodiments multiple control signals may be adjusted any suitable number of times before increasing the shock threshold of the shock detector.

Figure 5A:
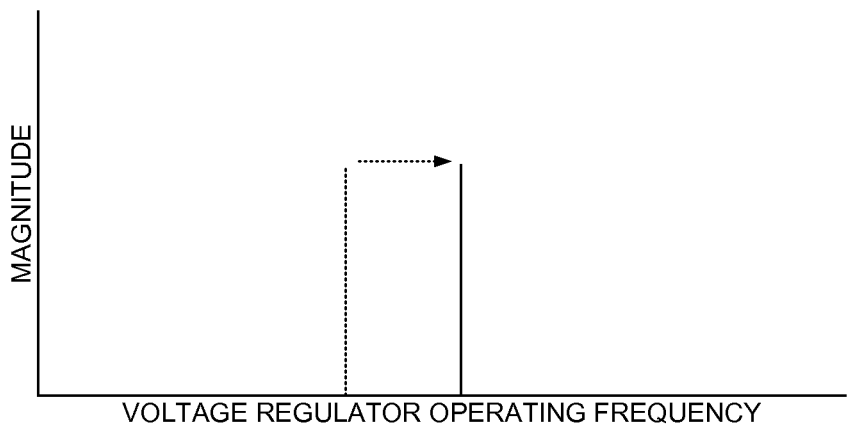
FIG. 5A shows an embodiment of the present invention wherein adjusting the control signal adjusts an operating frequency of a voltage regulator.

FIG. 5A shows a frequency spectrum according to an embodiment wherein the control signal adjusted by the control circuitry 6 (at block 14 of FIG. 1C) adjusts an operating frequency of a voltage regulator. For example, the voltage regulator may comprise a charge pump that charges/discharges a suitable element (e.g., a capacitor) at an operating frequency that may generate a peak in the noise spectrum that overlaps with the resonant frequency of the shock detector as illustrated in FIG. 1B. Therefore adjusting the operating frequency of the charge pump (higher or lower) may shift the peak in the noise spectrum away from the resonant frequency of the shock detector.

Figure 5B:
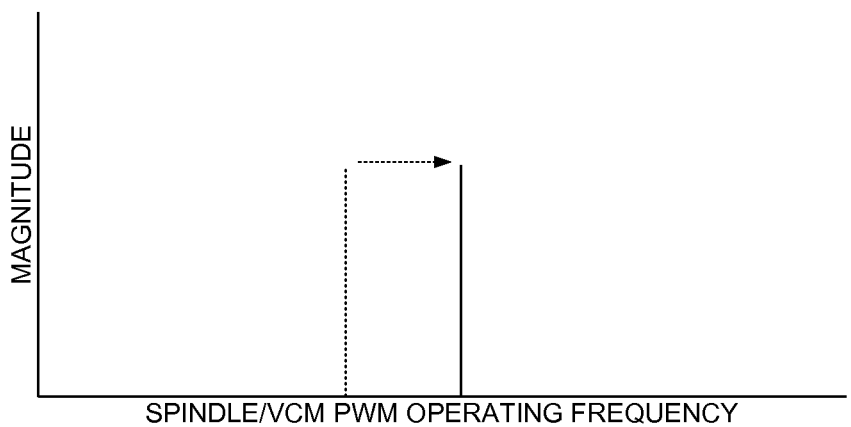
FIG. 5B shows an embodiment of the present invention wherein adjusting the control signal adjusts an operating frequency of a pulse width modulated (PWM) signal.

FIG. 5B shows a frequency spectrum according to an embodiment wherein the control signal adjusted by the control circuitry 6 adjusts an operating frequency of a pulse width modulated (PWM) signal. For example, the servo control system that actuates the head over the disk, or the servo control system that spins the disk, may comprise an H-bridge circuit that is driven by a PWM signal at an operating frequency. Adjusting the operating frequency of the PWM signal (higher or lower) may shift a peak in the noise spectrum away from the resonant frequency of the shock detector.

Figure 5C:
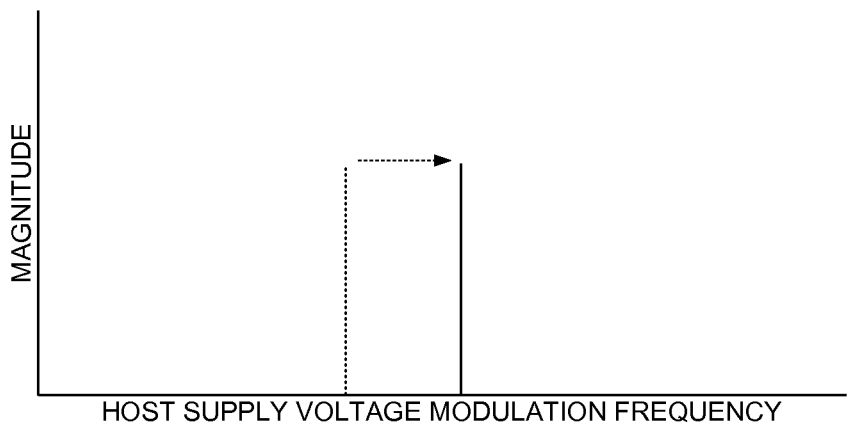
FIG. 5C shows an embodiment of the present invention wherein adjusting the control signal modulates a supply voltage received from a host.

FIG. 5C shows a frequency spectrum according to an embodiment wherein the control signal adjusted by the control circuitry 6 modulates a supply voltage received from a host. For example, in one embodiment the disk drive may comprise a bank of capacitors that are charged by the supply voltage and used as a backup power source during a power failure. In one embodiment, the bank of capacitors may be allowed to periodically discharge by a small amount and then recharge, wherein the operating frequency of the discharge/charge cycle may be adjusted (tuned) in order to shift a peak in the noise spectrum caused by noise in the supply voltage.

Figure 6A:
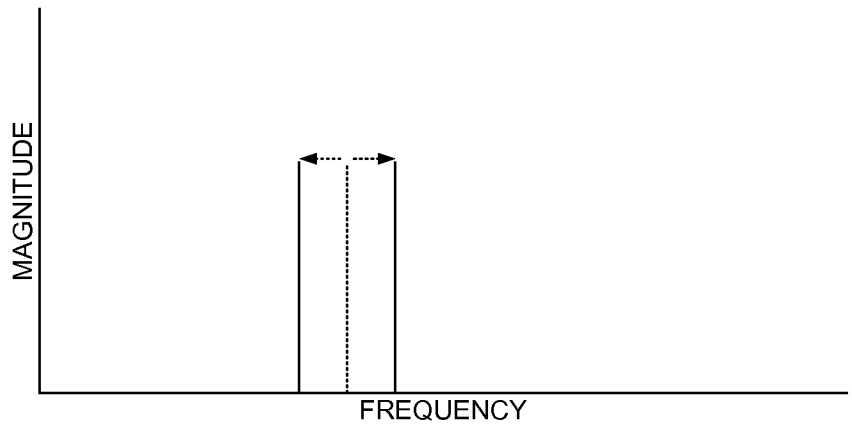
FIG. 6A shows an embodiment of the present invention wherein the control signal is adjusted by dithering the control signal between two different settings to generate two different operating frequencies.
Figure 6B:
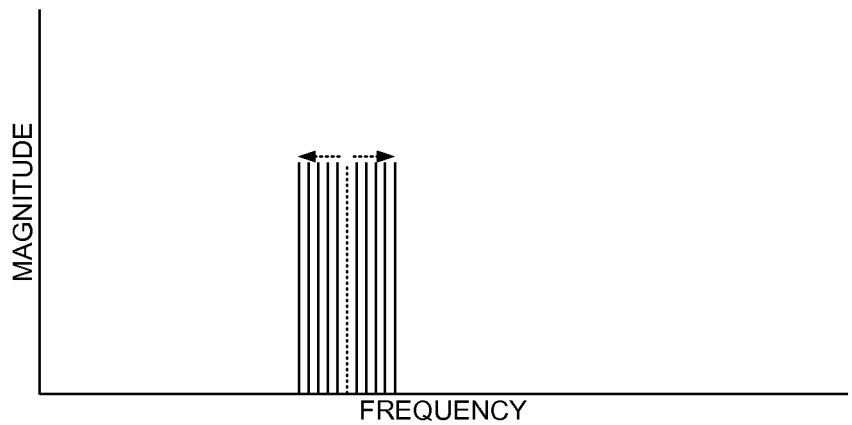
FIG. 6B shows an embodiment of the present invention wherein the control signal is dithered at a varying frequency in order to spread the frequency spectrum of the noise affecting the shock detector.

FIG. 6A shows a frequency spectrum according to an embodiment wherein the control signal may be dithered between two different values in order to dither an operating frequency between two different frequencies. This embodiment may dither a peak in the noise spectrum which may help reduce the excitation at the resonant frequency of the shock detector. FIG. 6B shows an embodiment wherein the control signal is dithered over multiple settings to generate an operating frequency at a varying frequency. This embodiment effectively spreads the operating frequency over any suitable range in order to spread the noise spectrum. In this embodiment, a peak in the noise spectrum may periodically align with the resonant frequency of the shock detector, but for only a short duration. This embodiment may provide a number of benefits, such as avoiding a calibration procedure that attempts to optimize the setting for the control signal. This embodiment may also avoid having to recalibrate the setting for the control signal if the resonant frequency of the shock detector changes over time due, for example, to changes in environmental conditions (e.g., changes in temperature).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit, power circuit, or regulator circuit, implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk; and
control circuitry including a shock detector, the control circuitry operable to:
initialize a shock threshold of the shock detector;
detect a first number of shock events in response to the shock detector operating at the initial shock threshold;
when the first number of shock events exceeds an upper event threshold, first adjust a control signal in order to first shift a peak in a magnitude response of a frequency spectrum of noise affecting the shock detector;
after first adjusting the control signal, detect a second number of shock events in response to the shock detector operating at the initial shock threshold; and
when the second number of shock events exceeds the upper event threshold, first increase the shock threshold.

2. The disk drive as recited in claim 1, wherein adjusting the control signal adjusts an operating frequency of a voltage regulator.

3. The disk drive as recited in claim 1, wherein adjusting the control signal adjusts an operating frequency of a pulse width modulated (PWM) signal.

4. The disk drive as recited in claim 3, wherein the control circuitry is operable to actuate the head over the disk in response to the PWM signal.

5. The disk drive as recited in claim 3, wherein the control circuitry is operable to spin the disk in response to the PWM signal.

6. The disk drive as recited in claim 1, wherein adjusting the control signal modulates a supply voltage received from a host.

7. The disk drive as recited in claim 1, wherein adjusting the control signal comprises dithering the control signal.

8. The disk drive as recited in claim 7, wherein dithering the control signal comprises dithering the control signal at a varying frequency.

9. The disk drive as recited in claim 1, wherein when the second number of shock events exceeds the upper event threshold, the control circuitry is further operable to:
second adjust the control signal in order to second shift the peak in the magnitude response of the frequency spectrum of noise affecting the shock detector;
detect a third number of shock events in response to the shock detector operating at the initial shock threshold; and
when the third number of shock events is less than the upper event threshold and greater than a lower event threshold, operate the shock detector based on the second adjustment to the control signal.

10. The disk drive as recited in claim 1, wherein after first increasing the shock threshold, the control circuitry is further operable to:
detect a third number of shock events in response to the shock detector operating at the increased shock threshold;
when the third number of shock events exceeds the upper event threshold, second shift the peak in the magnitude response of the control signal in order to adjust the frequency spectrum of noise affecting the shock detector;
after second adjusting the control signal, detect a fourth number of shock events in response to the shock detector operating at the increased shock threshold; and
when the fourth number of shock events exceeds the upper event threshold, second increase the shock threshold.

11. The disk drive as recited in claim 1, wherein after first increasing the shock threshold, the control circuitry is further operable to:
detect a third number of shock events in response to the shock detector operating at the increased shock threshold; and
when the third number of shock events falls below a lower event threshold, decrease the shock threshold to the initial shock threshold.

12. A method of operating a disk drive comprising a head actuated over a disk, and control circuitry including a shock detector, the method comprising:
initializing a shock threshold of the shock detector;
detecting a first number of shock events in response to the shock detector operating at the initial shock threshold;
when the first number of shock events exceeds an upper event threshold, first adjusting a control signal in order to first shift a peak in a magnitude response of a frequency spectrum of noise affecting the shock detector;
after first adjusting the control signal, detecting a second number of shock events in response to the shock detector operating at the initial shock threshold; and
when the second number of shock events exceeds the upper event threshold, first increasing the shock threshold.

13. The method as recited in claim 12, wherein adjusting the control signal adjusts an operating frequency of a voltage regulator.

14. The method as recited in claim 12, wherein adjusting the control signal adjusts an operating frequency of a pulse width modulated (PWM) signal.

15. The method as recited in claim 14, further comprising actuating the head over the disk in response to the PWM signal.

16. The method as recited in claim 14, further comprising spinning the disk in response to the PWM signal.

17. The method as recited in claim 12, wherein adjusting the control signal modulates a supply voltage received from a host.

18. The method as recited in claim 12, wherein adjusting the control signal comprises dithering the control signal.

19. The method as recited in claim 18, wherein dithering the control signal comprises dithering the control signal at a varying frequency.

20. The method as recited in claim 12, wherein when the second number of shock events exceeds the upper event threshold, further comprising:
second adjusting the control signal in order to second shift the peak in the magnitude response of the frequency spectrum of noise affecting the shock detector;
detecting a third number of shock events in response to the shock detector operating at the initial shock threshold; and
when the third number of shock events is less than the upper event threshold and greater than a lower event threshold, operating the shock detector based on the second adjustment to the control signal.

21. The method as recited in claim 12, wherein after first increasing the shock threshold, further comprising:
detecting a third number of shock events in response to the shock detector operating at the increased shock threshold;
when the third number of shock events exceeds the upper event threshold, second adjusting the control signal in order to shift the peak in the magnitude response of the frequency spectrum of noise affecting the shock detector;

after second adjusting the control signal, detecting a fourth number of shock events in response to the shock detector operating at the increased shock threshold; and when the fourth number of shock events exceeds the upper event threshold, second increasing the shock threshold.

22. The method as recited in claim 12, wherein after first increasing the shock threshold, further comprising:

detecting a third number of shock events in response to the shock detector operating at the increased shock threshold; and when the third number of shock events falls below a lower event threshold, decreasing the shock threshold to the initial shock threshold.

\* \* \* \* \*